United States Patent
Ryberg et al.

[15] 3,691,762
[45] Sept. 19, 1972

[54] CARBURETED REACTOR COMBUSTION SYSTEM FOR GAS TURBINE ENGINE

[72] Inventors: John G. Ryberg; Ernest W. Landen, both of Peoria, Ill.

[73] Assignee: Caterpillar Tractor Co, Peoria, Ill.

[22] Filed: Dec. 4, 1970

[21] Appl. No.: 95,050

[52] U.S. Cl............60/39.51 R, 60/39.23, 60/39.65, 60/39.71, 60/39.74 R
[51] Int. Cl..............................................F02c 7/10
[58] Field of Search........60/39.74 R, 39.71, 39.51 R, 60/39.23, 39.65, 39.29, 39.52; 431/353, 354

[56] References Cited

UNITED STATES PATENTS

| | | | |
|---|---|---|---|
| 2,097,255 | 10/1937 | Saha | 60/39.69 |
| 2,560,076 | 7/1951 | Bloomer | 60/39.74 R |
| 2,621,477 | 12/1952 | Powter | 60/39.71 |
| 2,632,298 | 3/1953 | Willgoos | 60/39.74 R |
| 2,674,846 | 4/1954 | Bloomer | 60/39.65 |
| 2,713,245 | 7/1955 | Weaving | 60/39.51 R |
| 3,067,582 | 12/1962 | Schirmer | 60/39.74 R |
| 3,224,195 | 12/1965 | Walsh | 60/39.74 R |
| 3,475,907 | 11/1969 | Kellett | 60/39.74 R |
| 3,584,459 | 6/1971 | Amann | 60/39.23 |

Primary Examiner—Douglas Hart
Attorney—Fryer, Tjensvold, Feix, Phillips & Lempio

[57] ABSTRACT

A carbureted reactor combustion system for use in a gas turbine power plant. Said combustion system has an tangential air swirler means and a vaporizing tube wherein liquid fuel is entrained by swirling air and vaporized by heat from recirculating combustion gases and highly compressed intake air. The vaporizing tube is located separately from and upstream of the reaction chamber to afford protection from the destructive heat encountered therein. The system provides a homogeneous and stoichiometric mixture of air and fuel which burns completely and produces a substantially pollutant-free exhaust. The entrained liquid fuel is supplied to said vaporizing tube at sump pressure or some other very low pressure and is not injected. Ingress of said fuel to said vaporizing tube is controlled solely by and in proportion to the swirling air flow. A controlled and constant air-fuel ratio is obtained without recourse to a separate control system for the fuel supply. The gas turbine power plant is capable of selective operation on a simple cycle or a mixed, simple and regenerative cycle.

10 Claims, 4 Drawing Figures

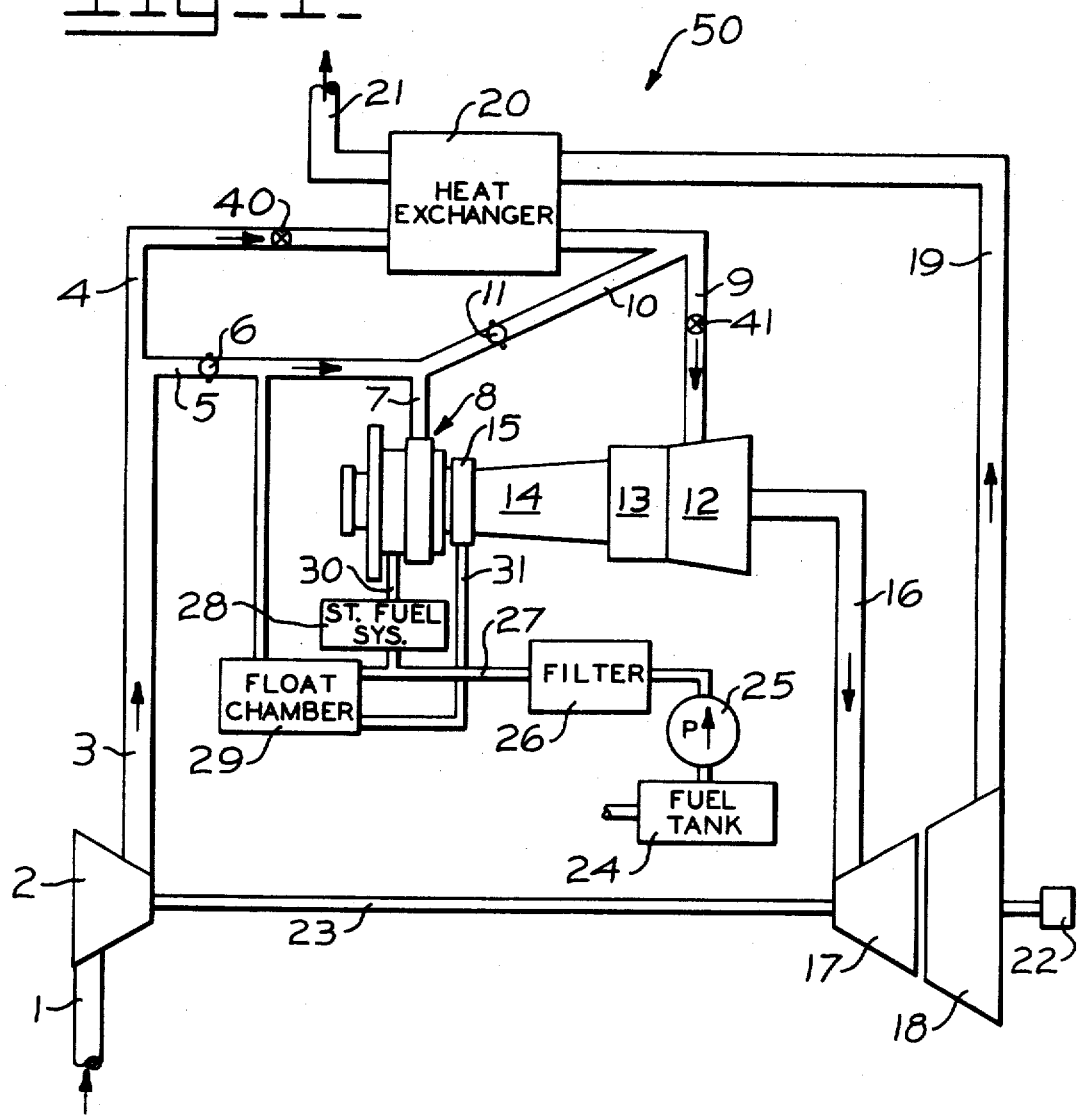

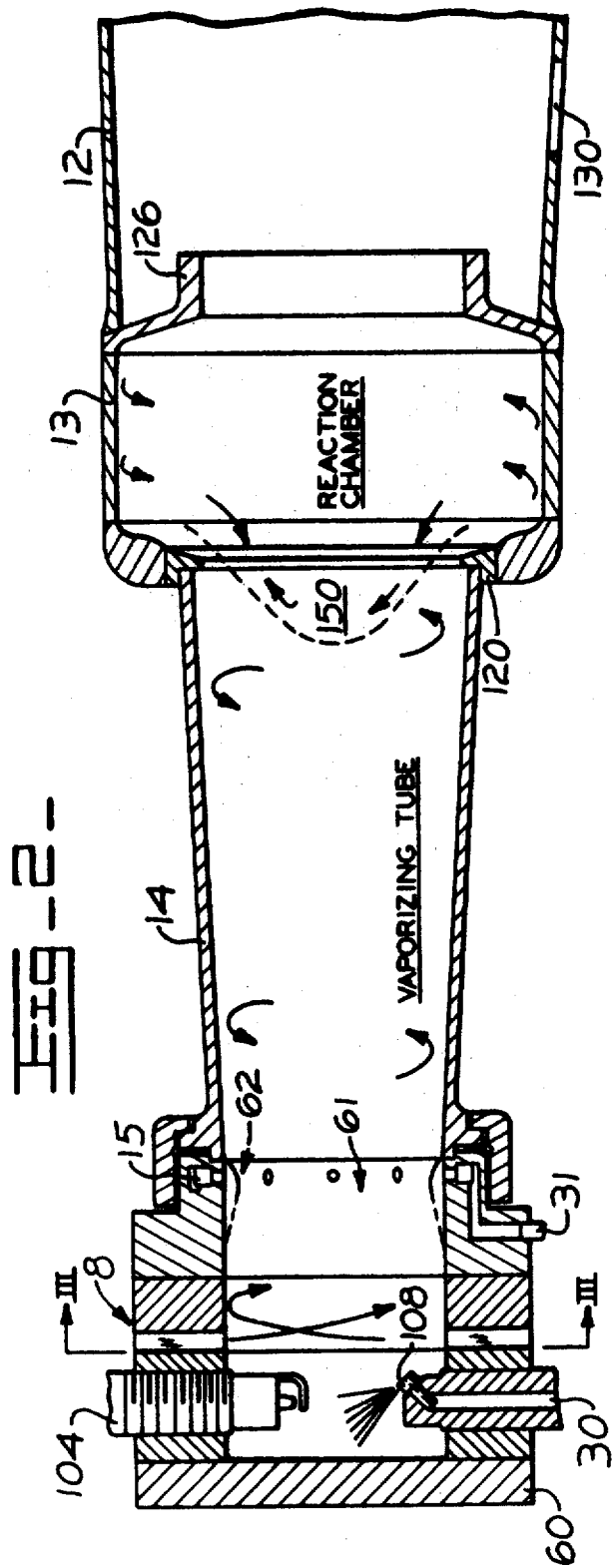
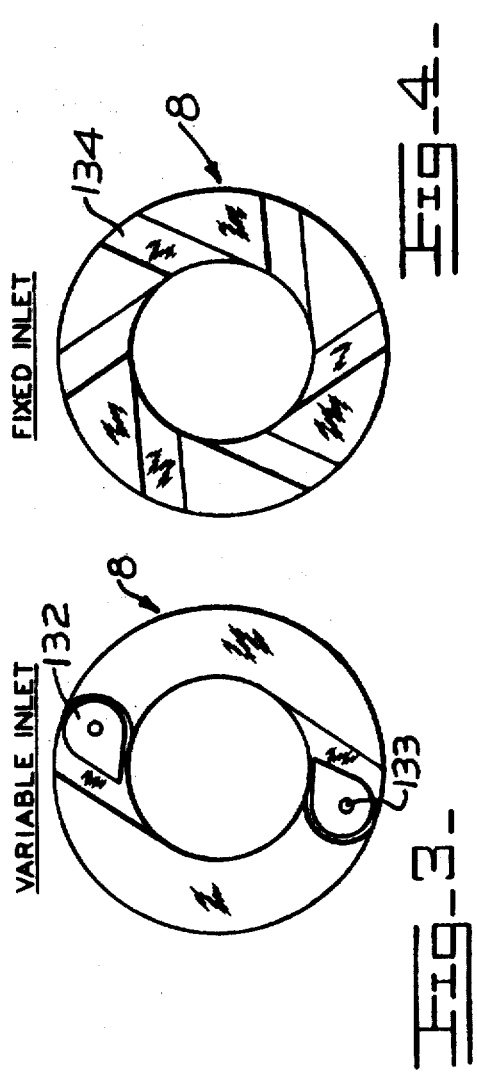
INVENTORS
JOHN G. RYBERG
ERNEST W. LANDEN

CARBURETED REACTOR COMBUSTION SYSTEM FOR GAS TURBINE ENGINE

BACKGROUND OF THE INVENTION

This invention relates to a new and improved gas turbine power plant. More particularly, the invention is directed to a new carbureted reactor combustion system for a gas turbine power plant and to an arrangement whereby the power plant may be optionally operated on either a simple cycle or on a mixed, simple and regenerative cycle.

Efficient and complete combustion of fuel in a continuous combustion power plant such as the gas turbine engine has been a vexing problem for some time. Incomplete combustion, particularly when utilizing hydrocarbon fuels, results in the formation of free liquid or solid-phase carbon deposits and other constituents in the exhaust emission.

Additionally, these carbon formations tend to become incandescent and heat localized areas of the combustion system by radiation to peak temperatures within the range of 3,000° F. Temperatures of this magnitude present serious heat load problems for the engine.

One attempt to correct these problems by providing a thoroughly mixed, homogenous combustible mixture has been the utilization of a fuel vaporization tube placed within the burner section of the engine. In this tube, liquid fuel is vaporized by the heat of the surrounding combustion flames and combined with air prior to admission to the surrounding burning zone. Such a system is shown in U.S. Pat. No. 2,930,191 to Schirmer et al.

Another attempt to prepare a homogenous, constantly proportioned air-fuel mixture has been the utilization of various forms of fuel atomizers and injectors. In atomizer systems, liquid fuel is caused to impinge upon a solid surface or to flow through an abruptly restricted passage to from a fine liquid mist which is combined macrocosmically with air prior to combustion. The U.S. Pat. No. 2,830,439 to Johnson et al. describes this type of system.

The aforementioned systems have been somewhat successful insofar as fuel-air mixing is concerned, but have been deficient in other respects. For example, pre-vaporizing tubes, such as that showy by Schirmer et al., have been traditionally located within the combustor or burner section and directly exposed to burner flames and turbulence with consequent susceptibility to fracture and other damage. Also, atomizer-type fuel injectors are usually complex and expensive to fabricate.

Another system which is directed to solving some of the aforementioned problems is disclosed in an article entitled THE FILM VAPORIZATION COMBUSTOR by A. W. Hussmann and G.W. Maybach, appearing in S.A.E. Transactions, Vol. 69, pp. 563–574 (1961). That system operates on the pre-vaporization principle but provides a vaporization tube disposed upstream of and separate from the associated combustion chamber. The Hussmann-Maybach system also incorporates a series of axial-flow blades at the inlet of the vaporizing tube which create an axially emitted swirling air pattern in said tube to promote through mixing of fuel and air. Fuel is injected under pressure into said vaporizing tube and its flow is controlled by a valving system.

The present invention is principally directed to a new and improved continuous-flow power plant and a combustion system therefor, which operates on the pre-vaporization concept and which incorporates features which drastically improve fuel-air mixing and control and which produces a substantially pollutant-free exhaust emission.

One of the objects of this invention is to provide a combustion system which does not require expensive high-pressure fuel injection apparatus and controls therefor.

Yet another object of this invention is to provide a combustion system wherein the temperature of the exhaust emission is moderated to a level acceptable to the turbine section of the engine.

Another object of the invention is to provide a combustion system which completely and efficiently consumes all the fuel admitted thereto and thereby substantially eliminates the deposition of carbon or other fuel constituents on engine parts and in the exhaust emission.

Still another object of the present invention is to provide a gas turbine power plant which is capable of selectively operating on a simple cycle or on a mixed, simple and regenerative cycle.

Another object of this invention is to provide a combustion system which operates on a constant air-fuel ratio which ratio is within the stoichiometric range.

Yet another object of this invention is to provide a combustion system wherein the amount of fuel consumed depends upon, and is controlled exclusively by, the air flow rate into the system.

A still further object of this invention is to provide an engine starting system for a gas turbine engine which is separate from and independent of the normally operating system.

Another object of this invention is to provide a combustion system which includes a restricted throat portion at the inlet of a vaporizing tube for entraining fuel thereinto.

Yet another object of this invention is to provide air swirler means for a combustion system which admits air tangentially to a vaporizing tube.

Other objects and advantages of the present invention will become apparent from the following description and claims. The accompanying drawings show by way of illustration the preferred embodiments of the present invention and the principles thereof. It is recognized that other embodiments of the invention utilizing the same or equivalent principles may be used and structural changes may be made as desired by those skilled in the art without departing from the present invention and the purview of the appended claims.

BRIEF DESCRIPTION OF THE DRAWing

FIG. 1 is a schematic illustration of a gas turbine power plant utilizing the present invention;

FIG. 2 is a longitudinal sectional view of the carbureted reactor of the present invention;

FIG. 3 is a cross-sectional view taken along the lines of III—III of FIG. 2 and shows one embodiment of the tangential air swirler arrangement of the present invention; and FIG. 4 is another cross-sectional view taken along the lines of III—III of FIG. 2 and shows an alternate embodiment of the tangential air swirler arrangement.

DETAILED DESCRIPTION OF THE INVENTION

FIG. 1 shows a gas turbine power plant 50 constructed in accordance with the present invention.

A compressor 2 having an air inlet conduit 1 and an outlet conduit 3 is driven through shaft 23 by a gasifier turbine 17 and delivers compressed air to branch conduits 4 and 5. Air from conduit 4 passes through a valve 40 to a heat exchanger 20 where it absorbs heat and thence through conduit 9 and valve 41 to the mixing chamber 12 (more fully described hereinafter). Air in conduit 5 passes through a selectively variable butterfly-type valve 6, through conduit 7, and then through the primary air intake swirler arrangement shown generally at 8 into a vaporizing tube 14 wherein it is thoroughly mixed with vaporous fuel preparatory to passage into a reaction chamber 13. The mixture is burned in the reaction chamber and passed through an exhaust fluid mixing chamber 12, exhaust conduit 16, and thence to the gasifier turbine 17 and power turbine 18 to drive a load 22.

Liquid fuel for the system is supplied by a conventional fuel tank 24, low-pressure transfer pump 25, filter 26, conduit 27 and float chamber 29. Fuel used exclusively for engine starting purposes is supplied by a starting fuel system 28 through the conduit 30; and fuel for normal operation is supplied through conduit 31 to a fuel ring 15.

As mentioned hereinbefore, air which passes through the heat exchanges 20 and through the conduit 9 is sent to the mixing chamber 12. This air is used to dilute the hot exhaust products and moderate the temperature of the exhaust gases to a point suitable for gasifier turbine blade exposure.

The present invention provides for selective operation of the power plant on a regenerative-type cycle or on a combination of simple and regenerative cycles. For this purpose, the conduit 10 and butterfly valve 11 are provided to operate in conjunction with valves 6, 40 and 41 for supplying heated air from the heat exchanger 20 to the conduit 7 of the primary air swirler arrangement. The heat exchanger 20 receives hot combustion gases from the conduit 19 leading from the power turbine 18 and exhausts to the atmosphere through a conduit 21. By varying the opening of the valves 6, 11, 40 and 41, the cycle upon which the power plant operates may be selectively altered. With the valve 6 fully closed and the valves 11 and 40 fully open, the engine will operate on a fully regenerative cycle. With the valves 11 and 40 fully closed and the valve 6 open, the engine will operate on a simple cycle. It can be seen that by varying the condition of the valves 6, 11, 40 and 41, any combination or mixture of the above-mentioned cycles can be selected, depending upon the desired operating conditions.

FIG. 2 shows the carbureted reactor of the present invention in detail. The reactor is comprised of four sections. A vaporizing tube is shown generally at 14, an air swirler at 8, a reaction chamber at 13, and a mixing chamber at 12. As hereinbefore described, air from conduit 7 is admitted to the primary air swirling arrangement 8. An end wall 60 closes off the axial end of the reactor so that intake air may only enter the vaporizing tube tangentially, through the swirler arrangement 8. Said swirler arrangement, shown in the FIGS. 2 and 4, comprises a series of tangentially-arranged inlet slots 134 which slots produce a tangential swirling motion in the intake air and a torus-shaped flow pattern within the vaporizing tube 14 which closely adheres to the walls thereof. Fuel from fuel ring 15 is supplied to a plurality of passages at the inlet of the vaporizing tube under very low or supply sump pressure and is entrained by said swirling air pattern created by the primary air swirler arrangement and carried downstream along the walls of the vaporizing tube as a thin liquid film. The tangentially admitted, swirling primary air centrifuges the fuel and greatly enhances the creation of said thin liquid film.

The vaporizing tube is preferably conically-shaped, with an angle of axial divergence of approximately 5° shown in the instant embodiment. This conical configuration improves the fuel entrainment operation of the vaporizing tube. The conical portion of the tube, as shown, acts as a diffuser section which follows the entrainment throat section 61 at its confluence with the fuel ring 15. In some installations, it may be prudent to provide a more pronounced restriction or venturi throat such as is shown in phantom at 62. This would increase the pressure drop thereacross with consequent increased fuel entrainment capability.

The aforementioned liquid film receives heat from the walls of the vaporizing tube and from hot recirculating gases from the reaction chamber (described more fully hereinafter) and vaporizes as it moves along the walls of the vaporizing tube. The vapor fuel is then microscopically mixed with said swirling air prior to admittance to the reaction chamber 13.

The amount of liquid fuel drawn into the vaporizing tube will vary in proportion to the flow rate of air admitted to the swirler arrangement through the conduit 7 and valves 6, 40, 41 and 11.

It has been determined that a constant air-fuel ratio can be maintained throughout the operating range of the carbureted reactor by controlling only primary air flow, without recourse to separate control of fuel flow and pressure, Accordingly, the instant fuel supply system has no control valves or pressure regulating means as would be employed in conventional fuel injection systems. Instead, the fuel is transferred from the supply tank 24 to the fuel ring 15 under substantially supply sump pressure, taking into account conduit passage pressure losses and the like. From the fuel ring, the fuel is entrained by the motivated solely by the tangentially swirling intake air. Thus, by varying only the primary air flow, the amount of fuel admitted may be varied and the volumetric ratio between the two fluids may be held constant.

An annular ring 120 is provided at the intersection of the reaction chamber 13 and the vaporizing tube 14 to act as both a flame holder and as a perturber to provide turbulence in the air-fuel flow pattern for further improvement in air-fuel mixing.

The air-vapor mixture which enters the reaction chamber 13 enters in the form of a torus. This is due to the passage of the swirling air mass from the vaporizing tube wall over the annular ring 120 and then the rapid expansion thereof into the enlarged reaction chamber 13. The rotating, expanding flow mass from the conical vaporizing tube creates a low-pressure vortex along the axis of said vaporizing tube, which vortex is then filled by recirculating hot gases from the reaction chamber such as is shown at 150.

The cross-sectional area of the outlet of reaction chamber 126 is preferably either the same as the cross-sectional area of the inlet of said reaction chamber or is larger. It has been determined that this configuration further implements the aforementioned recirculation of hot combustion gases. The hot recirculating gases from the reaction chamber provide additional heat for the vaporization of liquid fuel in the vaporizing tube 14.

The hot gases exiting from the reaction chamber through outlet 126 are diluted and cooled by secondary air provided by the conduit 9 and valve 41 to the mixing chamber 12 through a plurality of registers 130 in the wall of mixing chamber in accordance with standard practice.

Ignition of the vapor-air mixture in the reaction chamber is initiated by a flame produced in the reaction vaporizing tube by a starting system which comprises an ignition means 104 and a starting fuel nozzle shown at 108. These components are separate from the normally operating fuel systems and operate independently thereof. The starting system provides ignition upon start-up for the power plant and then becomes inoperative during normal operations. The flame produced in the vaporizing tube by the starting system is moved downstream into the reaction chamber 13 by the tangentially-introduced, inrushing primary air from the air swirler section and is held within the reaction chamber by the combined effects of the aforementioned flame holder 120 and the cross-sectional dimensions of the inlet and the outlet of said reaction chamber.

As formerly stated, during normal operations, the amount of fuel which enters the vaporizing tube through fuel ring 15 depends upon the varies in proportion to the rate of air flow into said tube, which air flow entrains the low-pressure fuel. Therefore, once a particular fuel-air ratio is selected, e.g., a mixture which is ideally within the stoichiometric range, this ratio can be maintained constant throughout the entire range of operating conditions in the engine.

The amount of air entering the vaporizing tube 14 is regulated by the control of valves 6, 11, 40 and 41 and/or by the control of variable capacity swirler arrangement. Such a swirler arrangement is shown in FIG. 3 and comprises a plurality of vanes 132 which are pivotably moveable about the central axes 133 thereof to control the amount of primary air entering the vaporizing tube 14.

It should be noted that although the novel carbureted reactor combustion system has been described herein in relation to a gas turbine engine, it is apparent that said system has utility in any other type of continuous-flow combustion power plant.

While the preferred embodiments of the invention have been illustrated and described, it is to be understood that these embodiments are capable of variation and modification and are not limited to the precise details set forth, but rather include such variations and modifications as fall within the scope of the appended claims.

We claim:

1. In a continuous-flow power plant, a carbureted reactor means comprising; a reaction chamber means wherein combustion occurs, a fuel vaporizing means located separately and axially spaced from said reaction chamber means and upstream thereof in the main direction of fluid flow through said reaction chamber means, means connecting said fuel vaporizing means with said reaction chamber means, fuel supply sump means, means for supplying fuel from said sump means without substantially increasing the pressure thereof and air to said fuel vaporizing means at a substantially constant air-fuel ratio and in a manner which affords substantially complete mixing of these constituents prior to admission thereof to said reaction chamber for combustion, said means for supplying fuel and air causing the deposition of said fuel as a thin film within said vaporizing means prior to the mixing thereof with said air.

2. The invention of claim 1 further comprising compressor means for supplying compressed air to said carbureted reactor means and a gas turbine means operatively associated with and driven by combustion products from said carbureted reactor means.

3. The invention of claim 2 further comprising heat exchanger means arranged to receive compressed air from said compressor means and to heat said compressed air prior to its introduction into said carbureted reactor means, and control means to selectively vary the amount of compressed air passing through said heat exchanger means to said carbureted reactor means.

4. The invention of claim 1 wherein said fuel vaporizing means is closed at an axial end thereof by wall means impervious to axial flow for causing all air to enter said carbureted reactor means peripherally thereof.

5. The invention of claim 4 wherein said means for supplying air to said fuel vaporizing means comprises air swirler means for admitting said air to said fuel vaporizing means tangentially with respect to the axis of said fuel vaporizing means.

6. The invention of claim 5 wherein said air swirler means includes a plurality of slots radially obliquely disposed around the periphery of the inlet to said fuel vaporizing means.

7. The invention of claim 5 wherein said air swirler means includes a plurality of moveable members disposed around said fuel vaporizing means which are capable of selectively varying the amount of air admitted to said fuel vaporizing means.

8. The invention of claim 1 wherein means are provided for controlling said air supply independently of said fuel supply and wherein said air supply control means are capable of maintaining a constant air-fuel ratio which is substantially within the stoichiometric range to produce complete combustion and substantially pollutant-free exhaust.

9. The invention of claim 1 wherein restriction means are provided at the inlet of said fuel vaporizing means for creating a pressure reduction in the vicinity of said restriction means for entraining fuel into said fuel vaporizing means.

10. The invention of claim 1 wherein combustion initiating means comprising starting fuel supply means and starting ignition means are provided independently of said means for supplying fuel and air.

* * * * *